(12) United States Patent
Lee et al.

(10) Patent No.: US 8,989,822 B2
(45) Date of Patent: Mar. 24, 2015

(54) KEYPAD ASSEMBLY FOR USE ON A CONTOURED SURFACE OF A MOBILE COMPUTING DEVICE

(75) Inventors: Stephen Lee, San Francisco, CA (US); Troy Hulick, Saratoga, CA (US); Mark Babella, Salida, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1678 days.

(21) Appl. No.: 11/530,278

(22) Filed: Sep. 8, 2006

(65) Prior Publication Data
US 2008/0064451 A1 Mar. 13, 2008

(51) Int. Cl.
*H04M 1/00* (2006.01)
*H04M 1/23* (2006.01)
*G06F 1/16* (2006.01)

(52) U.S. Cl.
CPC .............. *H04M 1/23* (2013.01); *G06F 1/1626* (2013.01); *G06F 1/1662* (2013.01); *G06F 1/1671* (2013.01)
USPC .................................. 455/575.1; 379/433.07

(58) Field of Classification Search
CPC ..... H04M 1/23; H04M 1/0249; G06F 3/0202; G06F 1/1662; G06F 1/1626; G06F 3/0219; G06F 3/016; G06F 21/83
USPC ........................ 455/575.1; 345/168
See application file for complete search history.

(56) References Cited

U.S. PATENT DOCUMENTS

| | | | |
|---|---|---|---|
| 1,718,694 A | 6/1929 | Kurowski | |
| 3,396,827 A | 8/1968 | Harwell | |
| 3,744,034 A | 7/1973 | Paul | |
| 3,825,101 A * | 7/1974 | Wineman | 400/473 |
| 3,937,952 A | 2/1976 | Ripley et al. | |
| 4,022,993 A | 5/1977 | Shattuck | |
| 4,060,703 A | 11/1977 | Everett | |
| 4,135,074 A | 1/1979 | Malacheski | |
| 4,180,336 A | 12/1979 | Lonsdale | |
| 4,196,666 A | 4/1980 | Kobayashi et al. | |
| 4,237,351 A | 12/1980 | Boulanger et al. | |
| 4,320,268 A | 3/1982 | Brown | |
| 4,359,612 A | 11/1982 | Rooney | |
| 4,359,613 A | 11/1982 | Rooney | |

(Continued)

FOREIGN PATENT DOCUMENTS

| DE | 3235752 A1 | 3/1984 |
|---|---|---|
| DE | 10203400 | 6/2003 |

(Continued)

OTHER PUBLICATIONS

U.S. Appl. No. 12/129,674, filed May 29, 2008 48 pages.

*Primary Examiner* — George Eng
*Assistant Examiner* — Jing Gao
(74) *Attorney, Agent, or Firm* — Mahamedi Paradice LLP

(57) ABSTRACT

A mobile computing device is provided that includes a housing, a display screen, and a keypad. The housing includes a front face having a portion that has a contour. The contour may be is inwardly directed and be defined by at least a first gradient direction. The display screen is provided with the front face, apart from the portion that has the contour. The keypad includes a plurality of keycaps that extend outward from the front face. The keypad may be provided only on an occupied region of the portion of the front face that has the contour. A maximum angle formed by the occupied region of the front face relative to a horizontal reference that is coplanar with the display screen is greater than 20 degrees.

22 Claims, 6 Drawing Sheets

(56) References Cited

U.S. PATENT DOCUMENTS

| | | | |
|---|---|---|---|
| 4,394,555 A * | 7/1983 | Long et al. ............ 200/521 |
| 4,401,864 A | 8/1983 | Ichikawa |
| 4,559,705 A | 12/1985 | Hodge et al. |
| 4,564,751 A | 1/1986 | Alley et al. |
| RE32,419 E | 5/1987 | Rooney |
| 4,679,951 A | 7/1987 | King et al. |
| 4,703,139 A | 10/1987 | Dunlap |
| 4,735,520 A | 4/1988 | Suzuki et al. |
| 4,762,227 A | 8/1988 | Patterson |
| 4,802,210 A | 1/1989 | Spencer et al. |
| 4,839,474 A | 6/1989 | Hayes-Pankhurst et al. |
| 4,847,798 A | 7/1989 | Kurashima |
| 4,860,372 A | 8/1989 | Kuzunuki et al. |
| 4,916,441 A | 4/1990 | Gombrich |
| 4,972,051 A | 11/1990 | Hodsdon |
| 4,972,496 A | 11/1990 | Sklarew |
| D312,628 S | 12/1990 | Yokoi et al. |
| D313,401 S | 1/1991 | Tanabe |
| D313,413 S | 1/1991 | Langton |
| 4,994,992 A | 2/1991 | Lapeyre |
| 5,002,184 A | 3/1991 | Lloyd |
| 5,040,296 A | 8/1991 | Yerger |
| 5,049,862 A | 9/1991 | Dao et al. |
| 5,067,573 A | 11/1991 | Uchida |
| 5,107,739 A | 4/1992 | Muramatsu et al. |
| 5,128,829 A | 7/1992 | Loew |
| 5,138,119 A | 8/1992 | Demeo |
| 5,165,415 A | 11/1992 | Wallace et al. |
| 5,180,891 A | 1/1993 | Trumbo |
| 5,181,029 A | 1/1993 | Kim |
| 5,205,017 A | 4/1993 | Wang |
| 5,212,473 A | 5/1993 | Louis |
| 5,231,381 A | 7/1993 | Duwaer |
| 5,253,142 A | 10/1993 | Weng |
| 5,266,949 A | 11/1993 | Rossi |
| 5,274,217 A | 12/1993 | Kilian |
| 5,274,371 A | 12/1993 | Yang et al. |
| 5,280,283 A | 1/1994 | Raasch et al. |
| 5,283,862 A | 2/1994 | Lund |
| 5,305,394 A | 4/1994 | Tanaka |
| D355,165 S | 2/1995 | Sakaguchi et al. |
| 5,389,745 A | 2/1995 | Sakamoto |
| 5,401,917 A | 3/1995 | Yoshida et al. |
| 5,401,927 A | 3/1995 | Lundell et al. |
| 5,410,141 A | 4/1995 | Koenck et al. |
| 5,426,449 A | 6/1995 | Danziger |
| D359,920 S | 7/1995 | Sakamoto |
| 5,430,248 A | 7/1995 | Levy |
| 5,434,929 A | 7/1995 | Beemink et al. |
| D361,562 S | 8/1995 | Beltz |
| 5,444,192 A | 8/1995 | Shetye et al. |
| 5,448,433 A | 9/1995 | Morehouse et al. |
| 5,452,371 A | 9/1995 | Bozinovic et al. |
| 5,457,454 A | 10/1995 | Sugano |
| 5,471,023 A | 11/1995 | Kaizu et al. |
| D366,463 S | 1/1996 | Ive et al. |
| 5,489,924 A | 2/1996 | Shima et al. |
| D368,079 S | 3/1996 | Ive et al. |
| 5,500,643 A | 3/1996 | Grant |
| 5,506,749 A | 4/1996 | Matsuda |
| 5,510,584 A | 4/1996 | Norris |
| 5,515,045 A | 5/1996 | Tak et al. |
| 5,515,763 A | 5/1996 | Vandervoort |
| 5,528,743 A | 6/1996 | Tou et al. |
| 5,530,234 A | 6/1996 | Loh et al. |
| 5,534,892 A | 7/1996 | Tagawa |
| 5,548,477 A | 8/1996 | Kumar et al. |
| 5,550,715 A | 8/1996 | Hawkins |
| 5,555,157 A | 9/1996 | Moller et al. |
| 5,563,631 A | 10/1996 | Masunaga |
| 5,564,850 A | 10/1996 | Nagaoka |
| 5,576,502 A | 11/1996 | Fukushima et al. |
| 5,583,497 A | 12/1996 | Hankes |
| 5,597,244 A * | 1/1997 | Ueda et al. ............ 400/63 |
| 5,598,469 A | 1/1997 | Preker |
| 5,606,712 A | 2/1997 | Hidaka |
| 5,611,031 A | 3/1997 | Hertzfeld et al. |
| 5,615,284 A | 3/1997 | Rhyne et al. |
| 5,621,817 A | 4/1997 | Bozinovic et al. |
| 5,622,789 A | 4/1997 | Young |
| 5,630,148 A | 5/1997 | Norris |
| 5,635,682 A | 6/1997 | Cherdak et al. |
| 5,638,257 A | 6/1997 | Kumar et al. |
| 5,642,110 A | 6/1997 | Raasch et al. |
| D381,021 S | 7/1997 | Williams et al. |
| 5,646,649 A | 7/1997 | Iwata et al. |
| 5,657,459 A | 8/1997 | Yanagisawa et al. |
| 5,660,488 A | 8/1997 | Miller |
| 5,661,641 A | 8/1997 | Shindo |
| D383,756 S | 9/1997 | Henderson et al. |
| 5,682,182 A | 10/1997 | Tsubodaka |
| 5,698,822 A | 12/1997 | Haneda et al. |
| D390,509 S | 2/1998 | Antzinas et al. |
| 5,717,565 A | 2/1998 | Raasch |
| D392,968 S | 3/1998 | Johansson |
| 5,737,183 A | 4/1998 | Kobayashi et al. |
| D394,449 S | 5/1998 | Shimizu |
| 5,757,292 A | 5/1998 | Amro et al. |
| 5,757,681 A | 5/1998 | Suzuki et al. |
| 5,760,347 A | 6/1998 | Notarianni et al. |
| 5,767,464 A | 6/1998 | Dyer et al. |
| 5,774,384 A | 6/1998 | Okaya et al. |
| 5,786,061 A | 7/1998 | Banfield |
| 5,797,482 A | 8/1998 | La Pointe et al. |
| D398,307 S | 9/1998 | Collins |
| 5,805,157 A | 9/1998 | Bertram et al. |
| 5,805,402 A | 9/1998 | Maue et al. |
| 5,810,461 A | 9/1998 | Ive et al. |
| 5,818,437 A | 10/1998 | Grover et al. |
| 5,821,510 A | 10/1998 | Cohen et al. |
| 5,825,353 A | 10/1998 | Will |
| 5,831,555 A | 11/1998 | Yu et al. |
| 5,831,613 A | 11/1998 | Johnston et al. |
| 5,831,819 A | 11/1998 | Chacon et al. |
| 5,832,764 A | 11/1998 | Girard |
| 5,841,901 A | 11/1998 | Arai et al. |
| D402,572 S | 12/1998 | Han |
| 5,847,336 A | 12/1998 | Thornton |
| 5,848,298 A | 12/1998 | Steere, Jr. et al. |
| 5,889,512 A | 3/1999 | Moller et al. |
| D408,021 S | 4/1999 | Haitami et al. |
| 5,892,503 A | 4/1999 | Kim |
| D411,179 S | 6/1999 | Toyosato |
| D411,181 S | 6/1999 | Tamaki et al. |
| 5,913,629 A | 6/1999 | Hazzard |
| 5,914,708 A | 6/1999 | La Grange et al. |
| 5,915,228 A | 6/1999 | Kunihiro et al. |
| 5,926,119 A | 7/1999 | Lindeman et al. |
| 5,936,614 A | 8/1999 | An et al. |
| 5,941,648 A | 8/1999 | Robinson et al. |
| 5,942,177 A | 8/1999 | Banfield |
| 5,949,408 A | 9/1999 | Kang et al. |
| 5,953,205 A | 9/1999 | Kambayashi et al. |
| 5,954,437 A | 9/1999 | Wen-Hung |
| 5,973,621 A | 10/1999 | Levy |
| D416,001 S | 11/1999 | Tal et al. |
| D416,256 S | 11/1999 | Griffin et al. |
| 5,975,711 A | 11/1999 | Parker et al. |
| 5,995,026 A | 11/1999 | Sellers |
| D417,657 S | 12/1999 | Matsumoto |
| 6,014,009 A | 1/2000 | Wierzbicki et al. |
| D420,351 S | 2/2000 | Waldner |
| D420,987 S | 2/2000 | Miyahara et al. |
| 6,023,779 A | 2/2000 | Fullam et al. |
| 6,034,685 A | 3/2000 | Kuriyama et al. |
| D422,271 S | 4/2000 | Kawashima |
| D423,468 S | 4/2000 | Jenkins |
| 6,046,730 A | 4/2000 | Bowen et al. |
| 6,049,796 A | 4/2000 | Siitonen et al. |
| 6,050,735 A | 4/2000 | Hazzard |
| 6,052,070 A | 4/2000 | Kivela et al. |
| 6,052,279 A | 4/2000 | Friend et al. |
| D424,533 S | 5/2000 | Kandalepas |
| D426,236 S | 6/2000 | Kim et al. |

(56) References Cited

U.S. PATENT DOCUMENTS

| | | | |
|---|---|---|---|
| 6,088,022 A * | 7/2000 | Rakoski | 345/168 |
| 6,091,956 A | 7/2000 | Hollenberg | |
| 6,094,197 A | 7/2000 | Buxton et al. | |
| 6,100,875 A | 8/2000 | Goodman et al. | |
| 6,102,594 A | 8/2000 | Strom | |
| 6,102,721 A | 8/2000 | Seto et al. | |
| 6,103,979 A | 8/2000 | Motoyama et al. | |
| 6,107,997 A | 8/2000 | Ure | |
| 6,108,200 A | 8/2000 | Fullerton | |
| 6,109,528 A | 8/2000 | Kunert et al. | |
| 6,115,248 A | 9/2000 | Canova et al. | |
| D432,511 S | 10/2000 | Eckholm | |
| D433,017 S | 10/2000 | Martinez | |
| 6,129,430 A | 10/2000 | Wu | |
| 6,148,261 A | 11/2000 | Obradovich et al. | |
| 6,151,012 A | 11/2000 | Bullister | |
| 6,151,206 A | 11/2000 | Kato et al. | |
| 6,157,323 A | 12/2000 | Tso et al. | |
| D436,591 S | 1/2001 | Abston et al. | |
| D436,963 S | 1/2001 | Kim et al. | |
| 6,170,024 B1 | 1/2001 | Wakeland et al. | |
| 6,172,620 B1 | 1/2001 | Brick et al. | |
| 6,178,087 B1 | 1/2001 | Cho et al. | |
| 6,181,284 B1 | 1/2001 | Madsen et al. | |
| 6,195,589 B1 | 2/2001 | Ketcham | |
| D440,542 S | 4/2001 | Hawkins et al. | |
| 6,212,412 B1 | 4/2001 | Rogers et al. | |
| 6,217,183 B1 | 4/2001 | Shipman | |
| D441,733 S | 5/2001 | Do et al. | |
| 6,239,968 B1 | 5/2001 | Kim et al. | |
| 6,243,789 B1 | 6/2001 | Hasbun et al. | |
| 6,246,169 B1 | 6/2001 | Pruvot | |
| 6,249,276 B1 | 6/2001 | Ohno | |
| 6,266,240 B1 | 7/2001 | Urban et al. | |
| 6,278,442 B1 | 8/2001 | Griffin et al. | |
| 6,283,777 B1 | 9/2001 | Canova et al. | |
| D451,079 S | 11/2001 | Ali | |
| D453,334 S | 2/2002 | Hobday | |
| 6,346,973 B1 | 2/2002 | Shibamoto et al. | |
| 6,351,225 B1 | 2/2002 | Moreno | |
| D454,349 S | 3/2002 | Makidera et al. | |
| D454,849 S | 3/2002 | Eckholm | |
| 6,355,891 B1 | 3/2002 | Ikunami | |
| 6,356,442 B1 | 3/2002 | Lunsford | |
| 6,374,277 B2 | 4/2002 | Vong et al. | |
| 6,377,685 B1 | 4/2002 | Krishnan | |
| D456,794 S | 5/2002 | Laverick et al. | |
| 6,396,482 B1 | 5/2002 | Griffin et al. | |
| D458,239 S | 6/2002 | Shim et al. | |
| D459,327 S | 6/2002 | Ali | |
| D460,068 S | 7/2002 | Lanzaro et al. | |
| 6,423,918 B1 | 7/2002 | King et al. | |
| 6,426,197 B1 | 7/2002 | Change | |
| 6,452,588 B2 | 9/2002 | Griffin et al. | |
| 6,459,968 B1 | 10/2002 | Kochie | |
| 6,489,950 B1 | 12/2002 | Griffin et al. | |
| 6,507,336 B1 | 1/2003 | Lunsford | |
| 6,533,963 B1 | 3/2003 | Schleifstein et al. | |
| 6,535,199 B1 | 3/2003 | Canova, Jr. et al. | |
| D472,551 S | 4/2003 | Griffin | |
| D473,226 S | 4/2003 | Griffin | |
| 6,554,442 B2 | 4/2003 | Chou | |
| D476,985 S | 7/2003 | Griffin | |
| D478,585 S | 8/2003 | Griffin | |
| 6,609,805 B1 | 8/2003 | Nelson | |
| 6,611,254 B1 | 8/2003 | Griffin et al. | |
| 6,611,255 B2 | 8/2003 | Griffin et al. | |
| 6,626,551 B2 | 9/2003 | Funamoto et al. | |
| 6,641,315 B2 | 11/2003 | King et al. | |
| 6,677,931 B2 | 1/2004 | Chi et al. | |
| 6,679,613 B2 | 1/2004 | Mabuchi | |
| 6,717,083 B2 | 4/2004 | Chen et al. | |
| D490,076 S | 5/2004 | Griffin | |
| 6,741,215 B2 | 5/2004 | Grant et al. | |
| 6,743,993 B1 | 6/2004 | Clark et al. | |
| 6,747,402 B2 | 6/2004 | Hato et al. | |
| 6,748,116 B1 | 6/2004 | Yue | |
| 6,766,023 B2 | 7/2004 | Kiernan | |
| 6,776,497 B1 | 8/2004 | Huppi et al. | |
| 6,786,661 B2 | 9/2004 | King et al. | |
| 6,788,285 B2 | 9/2004 | Paolucci et al. | |
| 6,802,662 B1 * | 10/2004 | Cheng et al. | 400/489 |
| 6,808,325 B2 | 10/2004 | King et al. | |
| D497,907 S | 11/2004 | Griffin | |
| 6,854,870 B2 | 2/2005 | Huizenga | |
| 6,867,763 B2 | 3/2005 | Griffin et al. | |
| 6,873,317 B1 | 3/2005 | Griffin et al. | |
| 6,882,337 B2 | 4/2005 | Shetter | |
| 6,891,529 B2 | 5/2005 | Ladouceur et al. | |
| 6,918,707 B2 | 7/2005 | King et al. | |
| 6,919,879 B2 | 7/2005 | Griffin et al. | |
| 6,921,221 B2 | 7/2005 | King et al. | |
| 6,923,583 B2 | 8/2005 | King et al. | |
| 6,924,789 B2 | 8/2005 | Bick | |
| 6,931,125 B2 | 8/2005 | Smallwood | |
| 6,940,490 B2 | 9/2005 | Kim et al. | |
| 6,981,791 B2 | 1/2006 | Higashiyama | |
| 6,987,466 B1 | 1/2006 | Welch et al. | |
| 7,027,036 B2 | 4/2006 | Yang | |
| 7,129,433 B2 | 10/2006 | Tokusashi | |
| 7,158,120 B2 | 1/2007 | Griffin et al. | |
| 7,158,147 B2 | 1/2007 | Watson et al. | |
| 7,182,533 B1 | 2/2007 | Caplan | |
| 7,182,907 B2 | 2/2007 | Shimizu et al. | |
| 7,196,693 B2 | 3/2007 | Chien et al. | |
| 7,227,536 B2 | 6/2007 | Griffin et al. | |
| 7,250,937 B2 | 7/2007 | Takagi | |
| 7,259,339 B1 | 8/2007 | Babella | |
| 7,265,745 B1 | 9/2007 | Kling | |
| 7,275,836 B2 | 10/2007 | Yurochko | |
| 7,294,802 B2 | 11/2007 | Yurochko | |
| 7,324,091 B2 | 1/2008 | Fyke | |
| 7,391,861 B2 | 6/2008 | Levy | |
| 7,394,030 B2 | 7/2008 | Yurochko et al. | |
| 7,394,456 B2 | 7/2008 | Kim et al. | |
| 7,502,462 B2 | 3/2009 | Rak et al. | |
| 7,511,700 B2 | 3/2009 | Skillman | |
| 7,525,053 B2 | 4/2009 | Babella | |
| 7,525,534 B2 | 4/2009 | Skillman et al. | |
| 7,623,118 B2 | 11/2009 | Skillman et al. | |
| 2002/0021562 A1 | 2/2002 | Tholin et al. | |
| 2002/0030987 A1 | 3/2002 | Saito et al. | |
| 2002/0044136 A1 | 4/2002 | Griffin et al. | |
| 2002/0079211 A1 | 6/2002 | Katayama et al. | |
| 2002/0110238 A1 | 8/2002 | Kiernan | |
| 2002/0196618 A1 | 12/2002 | Douzono et al. | |
| 2003/0054854 A1 * | 3/2003 | Kela et al. | 455/550 |
| 2003/0063087 A1 | 4/2003 | Doyle et al. | |
| 2003/0112620 A1 | 6/2003 | Prindle | |
| 2003/0156381 A1 | 8/2003 | Lieu et al. | |
| 2003/0213683 A1 | 11/2003 | Shimizu et al. | |
| 2004/0145573 A1 | 7/2004 | Han et al. | |
| 2004/0165924 A1 | 8/2004 | Griffin | |
| 2005/0105256 A1 | 5/2005 | Chuang | |
| 2005/0140653 A1 | 6/2005 | Pletikosa et al. | |
| 2005/0174334 A1 | 8/2005 | Hannay | |
| 2005/0216278 A1 | 9/2005 | Eisen | |
| 2005/0248537 A1 * | 11/2005 | Kim et al. | 345/168 |
| 2005/0259069 A1 | 11/2005 | Baker et al. | |
| 2006/0033704 A1 | 2/2006 | Ladouceur et al. | |
| 2006/0118400 A1 | 6/2006 | Chyc et al. | |
| 2006/0146027 A1 | 7/2006 | Tracy et al. | |
| 2006/0172785 A1 * | 8/2006 | Phillips et al. | 455/575.1 |
| 2006/0202966 A1 | 9/2006 | Skillman | |
| 2006/0202967 A1 | 9/2006 | Skillman et al. | |
| 2006/0202968 A1 | 9/2006 | Skillman et al. | |
| 2006/0204303 A1 * | 9/2006 | Yurochko et al. | 400/49 |
| 2006/0260921 A1 * | 11/2006 | Lee et al. | 200/313 |
| 2006/0261984 A1 * | 11/2006 | Jung et al. | 341/31 |
| 2006/0262095 A1 | 11/2006 | Ladouceur et al. | |
| 2007/0034494 A1 | 2/2007 | Yurochko | |
| 2007/0035522 A1 | 2/2007 | Yurochko et al. | |
| 2007/0035962 A1 | 2/2007 | Yurochko | |
| 2007/0200828 A1 | 8/2007 | Skillman | |

(56) References Cited

U.S. PATENT DOCUMENTS

| | | |
|---|---|---|
| 2007/0256915 A1 | 11/2007 | Levy |
| 2008/0013300 A1 | 1/2008 | Yurochko |
| 2008/0088490 A1 | 4/2008 | Yurochko |
| 2008/0283378 A1 | 11/2008 | Yurochko et al. |
| 2009/0173614 A1 | 7/2009 | Babella |
| 2009/0179861 A1 | 7/2009 | Skillman et al. |
| 2009/0295605 A1 | 12/2009 | Skillman |

FOREIGN PATENT DOCUMENTS

| | | |
|---|---|---|
| EP | 07060291 A2 | 3/1997 |
| EP | 1143327 A1 | 10/2001 |
| EP | 1172989 | 1/2002 |
| EP | 1197835 | 1/2002 |
| EP | 1265261 | 12/2002 |
| EP | 1507189 A1 | 2/2005 |
| EP | 1523021 A1 | 4/2005 |
| EP | 1569070 A1 | 8/2005 |
| EP | 1569077 A1 | 8/2005 |
| EP | 1575069 A1 | 9/2005 |
| EP | 1585153 A1 | 10/2005 |
| EP | 1619705 A1 | 1/2006 |
| EP | 1619860 A1 | 1/2006 |
| EP | 1696448 | 8/2006 |
| JP | 2001126588 | 5/2001 |
| WO | WO81/02272 | 8/1981 |
| WO | WO96/27256 | 9/1996 |
| WO | WO98/01876 | 1/1998 |
| WO | WO99/37025 A | 7/1999 |
| WO | WO00/30381 A | 5/2000 |
| WO | WO03/007582 | 1/2003 |
| WO | WO04/001578 | 12/2003 |
| WO | WO2004/059955 | 7/2004 |

\* cited by examiner

KEYPAD ASSEMBLY FOR USE ON A CONTOURED SURFACE OF A MOBILE COMPUTING DEVICE

TECHNICAL FIELD

The disclosed embodiments relate to a keypad assembly for a mobile computing device. In particular, the disclosed embodiments relate to a keypad assembly for use on an inclined surface of a mobile computing device.

BACKGROUND

Over the last several years, the growth of cell phones and messaging devices has increased the need for keypads that are small and tightly spaced. In particular, small form-factor keyboards, including QWERTY layouts, have become smaller and more tightly spaced. With decreasing overall size, there has been greater focus on efforts to make individual keys more usable to a user. For example, keyboard design considers how readily the user can select or click ("clickability") individual key structures of keyboard. The clickability may be affected by various factors, such as the individual key structure size and shape, as well as the spacing between key structures and the tactile response of individual key structures.

With the growth of small form-factor devices, such as cell phones and wireless messaging devices, design parameters may provide for smaller functional keypads, particularly with respect to keypads that provide character entry. For example, keyboard layouts have been designed using button structures and individual key orientations that reduce the overall surface area of the keypad. Such designs have often focused on QWERTY keyboard layouts, which normally require at least 26-50 individual keys.

In addition to keypad design, the shape and design of the device housing is also of interest. Along with the display, the keypad is typically one of the limiting factors in the size of a device housing. Consideration is often needed for the geometry and size of the area of the housing that is to accommodate the keypad (or vice-versa). Various factors and influences may affect the desired housing shape. For example, the shape of the device housing can be made contoured to better fit the user's hand, or to create a distinctive and identifiable shape. Concerns such as the overall thickness or length of the device often play an important role in the overall shape of the housing design.

BRIEF DESCRIPTION OF THE DRAWINGS

FIG. 6 is a sectional view of key assemblies of different rows of a keypad assembly, under an embodiment of the invention

DETAILED DESCRIPTION

Figure 1:
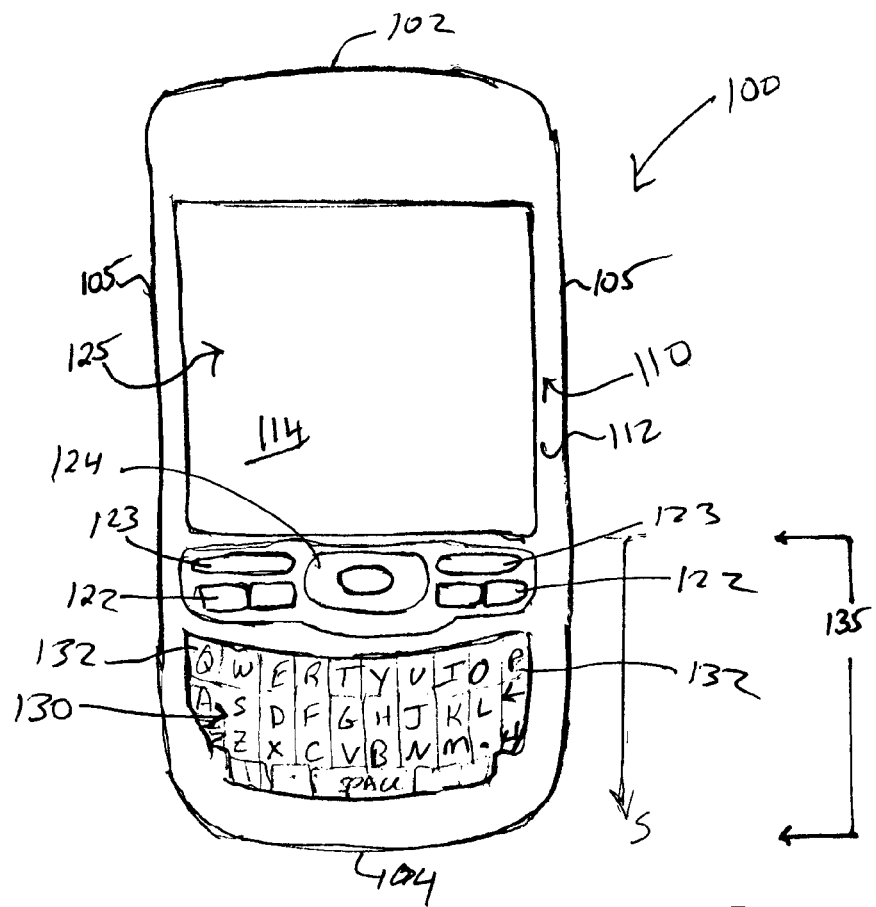
FIG. 1 illustrates a mobile computing device having a small-form-factored keyboard, according to an embodiment of the invention.

Embodiments described herein provide a keypad on an inclined or inwardly contoured surface of an electronic device. According to embodiments described herein, the keypad is provided on an inclined or inwardly contoured surface that occupies a portion of a front face of the computing device. The contoured portion of the front face may be adjacent to a display area, or other region or surface of the front face that provides a horizontal reference. Numerous features are described for facilitating the positioning of a keypad assembly on an inclined or contoured portion of the device housing, and such features may be considered individually or in combination with one or more other such features.

The term "keypad" includes any arrangement of keys or buttons that enable character input, including alphabetical or numerical entries. A keyboard, such as one with a QWERTY layout, is a class or type of keypad. A set of keys that provide a primary purpose of providing a numeric layout is another type of keypad. One or more embodiments contemplate use of a keypad that can provide full QWERTY functionality, including keypads that have a sufficient number of keys so that one key can be assigned to an individual letter. Other keyboard layouts are also contemplated, such as AZERTY and QWERTZ layouts.

As used herein, the term "layer", in a vertical assembly such as described with a keypad, means an occupied thickness or region, regardless of whether or not components that constitute the layer are interconnected or discretely provided. For example, a plurality of keys may be independently formed and distributed on a device to collectively provide a key layer or actuation member layer.

The term "about", when used in the context of something being equal to a stated quantity (e.g. "about equal to"), means an approximation that is accurate to the level of a manufacturing tolerance.

According to an embodiment, mobile computing device is provided that includes a housing having a display area, a front face and a back face. The housing is contoured so that a portion of the front face is oriented inwards towards the back face. A keypad includes a plurality of individual keys, including at least a set of multiple keys that are provided on the portion of the front face that is oriented inward.

According to one or more embodiments, a mobile computing device is provided that includes a housing, a display screen, and a keypad. The housing includes a front face having a portion that has a contour. The contour may be is inwardly directed and be defined by at least a first gradient direction. The display screen is provided with the front face, apart from the portion that has the contour. The keypad includes a plurality of keycaps that extend outward from the front face. The keypad may be provided only on an occupied region of the portion of the front face that has the contour. A maximum angle formed by the occupied region of the front face relative to a horizontal reference that is coplanar with the display screen is greater than 20 degrees.

According to another embodiment, a housing is provided that includes a display area. The housing has a front face on which an inwardly directed contour is provided on only a portion. A keypad assembly includes a plurality of key structures and a substrate that provides a plurality of electrical contacts. Individual key structures in the keypad align to actuate a corresponding one of the electrical contacts on the substrate by inward movement. The plurality of key structures each include a corresponding key cap that is formed over a matrix and wherein the height distance of individual key structures are varied at least in part by the corresponding key caps of those key structures being varied in height along at least the first gradient direction of the contour.

According to another embodiment, a keypad assembly is provided for a mobile computing device. The keypad assembly includes a key layer, a substrate and an actuation member layer. The key layer comprises a plurality of keys. The substrate includes a plurality of electrical contacts, individually aligned to underlie corresponding keys of the key layer. The actuation member layer includes a plurality of actuation members, each aligned to extend between a given key of the key layer and a corresponding electrical contact of the substrate, so that inward direction of the given key causes the actuation member to contact the corresponding electrical contact. In order to accommodate the contour of the housing of the mobile computing device, at least some of the actuation members have a length that is different than a length of a second set of actuation members.

Other features are also described with embodiments described below in order to facilitate use and incorporation of a keypad on a contoured surface of a mobile computing device. In particular, such features, either in combination or individually, enable use of the keypad on a relatively steep (e.g. more than 20 degrees) contour. Among other benefits, a keypad that accommodate a QWERTY layout can be provided on a front face that is contoured, to reduce thickness or volume of the device. Furthermore, the contouring of the front face can provide a distinctive feature to the overall design of the device.

Overview

FIG. 1 illustrates a mobile computing device having a small-form-factored keyboard, according to an embodiment of the invention. The computing device 100 includes a housing 110 that includes numerous internal components for operating the device, including one or more processors and memory components. Under one implementation, the mobile computing device 100 corresponds to a device capable of cellular telephony and ancillary functions that include various data transfer applications. Such devices are typically referred to as hybrid or smart phone devices, and utilize keypads that have alphanumeric functionality to enable both text entry for messaging and numeric entry for phone numbers. Examples of the type of ancillary functions that can be carried out by such devices include email, Short Message Service (SMS) messaging, Multimedia Messaging Service (MMS), camera/video capturing, music playback and global positioning service (GPS). However, embodiments described herein may be implemented on numerous other types of handheld or small-form-factor devices.

In FIG. 1, the housing 110 includes a front face 112 that provides a display area 114 and a keyboard 130. A display screen 125 on which computer-generated content may be displayed is provided in the display area 114. The front face 110 may be referenced against a top-down orientation (to match the orientation of content on the display screen 125), with a top end 102 and a bottom end 104 and opposing lateral sides 105.

The keyboard 130 is electronically coupled to an internal processing resource of the device. The keyboard 130 may be alphanumeric, to allow text and numeric entry for the various ancillary functions. In one embodiment, the keyboard 130 includes a QWERTY layout. In order to provide such a layout, the keyboard 130 may include a set of approximately 30-50 keys, so that there is a separate key for each letter of the alphabet. For example, one implementation contemplates 46 keys with inclusion of function keys, space bar and other QWERTY keys. Numerous other variations and layouts are also contemplated.

According to an embodiment, the front face 112 has a sloped or contoured region 135 or portion. As will be described with other embodiments, the sloped or contoured region 135 is inwardly directed, so that a thickness of the housing (i.e. a distance between a point on the front face 112 and a most proximate point on the back face (not shown)) decreases with progression towards the bottom end 104 of the device. The presence of the contour on the front face 112 is shown by a directional arrow S, which represents the direction of the gradient extending to the bottom 104 of the housing 110. In one embodiment, the display area 114 is assumed to define a horizontal reference plane (i.e. a plane that is coplanar to the display assembly 125). An embodiment of FIG. 1 assumes only one gradient, although other embodiments (such as described with FIGS. 8A, 8B, 9A and 9B) include multiple gradient directions.

In providing the keypad 130 on the contoured region 135 of the front face 112, individual keys 132 of the keypad may also be slightly inclined with respect to the display assembly or other horizontal reference. The particular angle of the incline of the individual keys 132 may vary. In one implementation, the tilt is less than 10 degrees, and more specifically between 0 and 6 degrees. Still further, one implementation provides for a maximum tilt of 3 degrees, defining the key on a contour with the largest tilt relative to the horizontal reference plane.

Likewise, the contour of the front face may accelerate from the display screen 125 or other horizontal reference with progression along the contoured region towards the bottom end 104. In one implementation, the maximum angle of the contour with respect to the horizontal reference is less than 35 degrees (which may be achieved towards the bottom end 104), and more particularly less between 15 and 25 degrees.

In an embodiment, additional push mechanisms 122, 123 and 124 may be provided on the front face 112. The additional push mechanisms 122, 123 and 124 may be in the form of different kinds of application buttons, having different shapes and construction. The push mechanisms 125 may correspond to a 5-way navigation button enabling directional input (4-way) and selection input. In an embodiment, the entire region of the front face 112 below the display area 114 has a contour or slope. As such, the additional push mechanisms may also be provided on a contour or sloped area.

In one embodiment, the keypad 130 is an integrated vertical assembly. As such, the keypad 130 has numerous vertical components (i.e. the stack), portions of which may collectively be described as layers. Under one embodiment, individual keys 132 are provided on a single matrix, so as to share the stack. The vertical elements or constituents of an individual key may alternatively be referred to as a key structure. As described with, for example, an embodiment of FIG. 3, the key structure may include a key cap extending from a matrix, and an actuation member extending below the matrix towards an electrical contact. The additional push mechanisms 122, 123 and 124 may be provided as an integrated component, or as two or more separate pieces.

Figure 2:
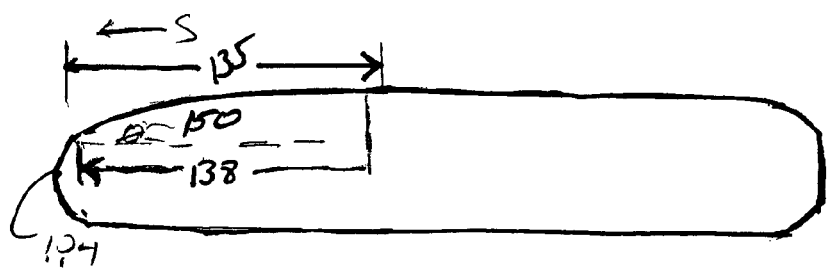
FIG. 2 illustrates a side view of the computing device of FIG. 1, under an embodiment of the invention.

FIG. 2 illustrates a side view of the computing device of FIG. 1, under an embodiment of the invention. As shown by FIG. 2, the sloped/contoured region 135 is arched, so that the inward contour is more pronounced towards the bottom 104. Accordingly, the thickness of the device lessens from the top most border of the contoured region 135 towards the bottom end 104.

In an embodiment shown by FIG. 2, the entire keypad 130 is provided on the sloped/contoured region 135. In particular, the boundary of the keypad 130 on the front face is referred to as the occupied region 138. The slope of the contoured region 135 may be defined by an angle of a horizontal reference, such as the display of the computing device, and a tangent of a particular point on the contoured region. The slope of the contoured region 135 may become more steep towards the bottom end 104. In one embodiment, a maximum angle 150 reflecting the maximum slope of the occupied region exceeds 20 degrees. In one implementation, the maximum slope is between 25 and 35 degrees. The additional push mechanisms 122, 123 and 124 may also be provided on the sloped/contoured region 135.

Keypad Construction

Figure 3:
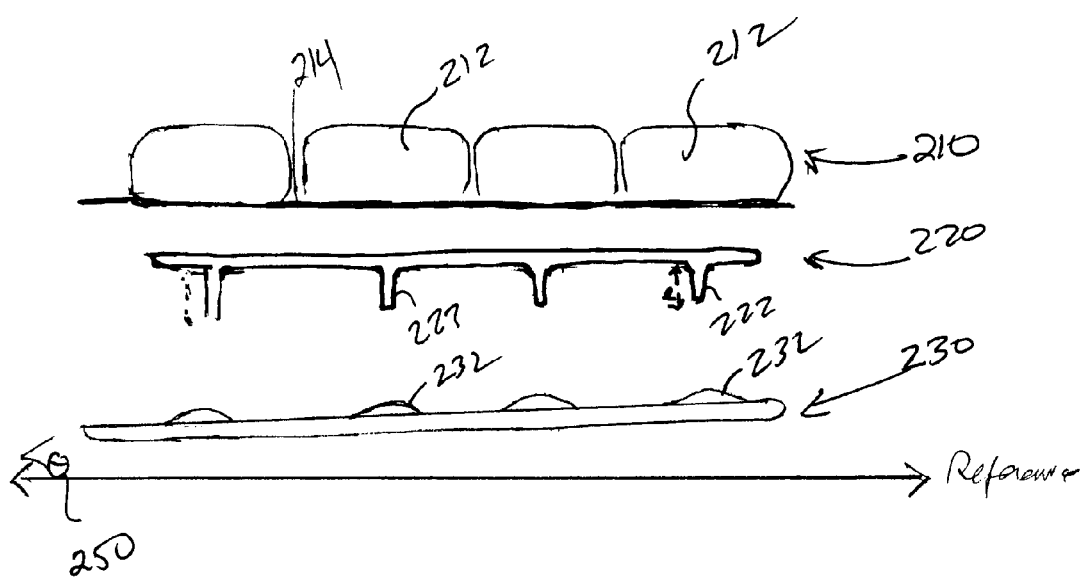
FIG. 3 illustrates a basic design construction for an integrated keypad, such as described with an embodiment of FIG. 1.

Numerous design features may be implemented in the construction or assembly of a keypad in order to accommodate the tilt or contoured surface on which the keypad is provided. FIG. 3 illustrates a basic design construction for a keypad assembly, such as described with an embodiment of FIG. 1. A keypad assembly 200 includes a key layer 210, an actuation member layer 220, and a substrate 230. The substrate 230 includes a plurality of electrical contacts 232. In one implementation, key layer 210 includes multiple key caps 212, formed over or otherwise provided on a matrix 214, so as to form an integrated unit. As described with an embodiment of FIG. 1, key layer 210 may include a sufficient number of key caps 212 to provide a QWERTY layout. The key layer 210 may underlie the front face 112 (FIG. 1) of the housing 110 (FIG. 1), so that the individual key caps 212 extend through corresponding holes in the front face 112.

The actuation member layer 220 may be provided either as a separate layer, or as an integrated portion of the key layer 210. For example, the actuation member layer 220 may comprise individual actuation members 222 that are integral to the key caps 212 of the key layer 210, and extend inward from a bottom of the individual key caps. Alternatively, the actuation members 222 may be provided on a separately formed matrix that can be positioned in alignment under the key layer 210. In either case, each of the actuation members 222 align with one of the key caps 212, so that pressing, pushing or inward direction of one of the key caps causes inward movement of one of the actuation members 222.

In one implementation, each electrical contact 232 is aligned and used by a corresponding, aligned key caps 212 and a corresponding actuation member 222. Pressing or other inward movement of one of the key caps 212 causes a corresponding one of the actuation members 222 to move into and actuate the aligned electrical contact 232. In this way, the pressing of the key caps 212 can cause the generation of an electrical signal. A processor of the computing device can identify the signal and determine a value assigned to the signal based at least in part on the particular electrical contact 232 that was triggered.

To accommodate the contour of the computing device 100 (FIG. 1), one of the features that can be incorporated into the construction of the keypad assembly 200 is a tilted substrate 230. The tilt of the substrate 230 may be relative the horizontal reference place 150 of the device (e.g. as defined by the display area). An angle 250 defined by the tilt of the substrate 230 may be sized depending on the amount of tilt needed to accommodate the contour of the face of the housing. In one embodiment, the angle 250 defining the tilt is less than degrees. More particular, an embodiment provides that the angle 250 is between 1 and 5 degrees, and with one implementation having an angle of about 3 degrees.

As an addition or alternative to tilting substrate 230, the matrix 214 may be provided at an acute angle as well. For example, the matrix 214 may be provided at an angle that is between 1 and 5 degrees, and with one implementation having an angle of about 3 degrees.

Figure 4:
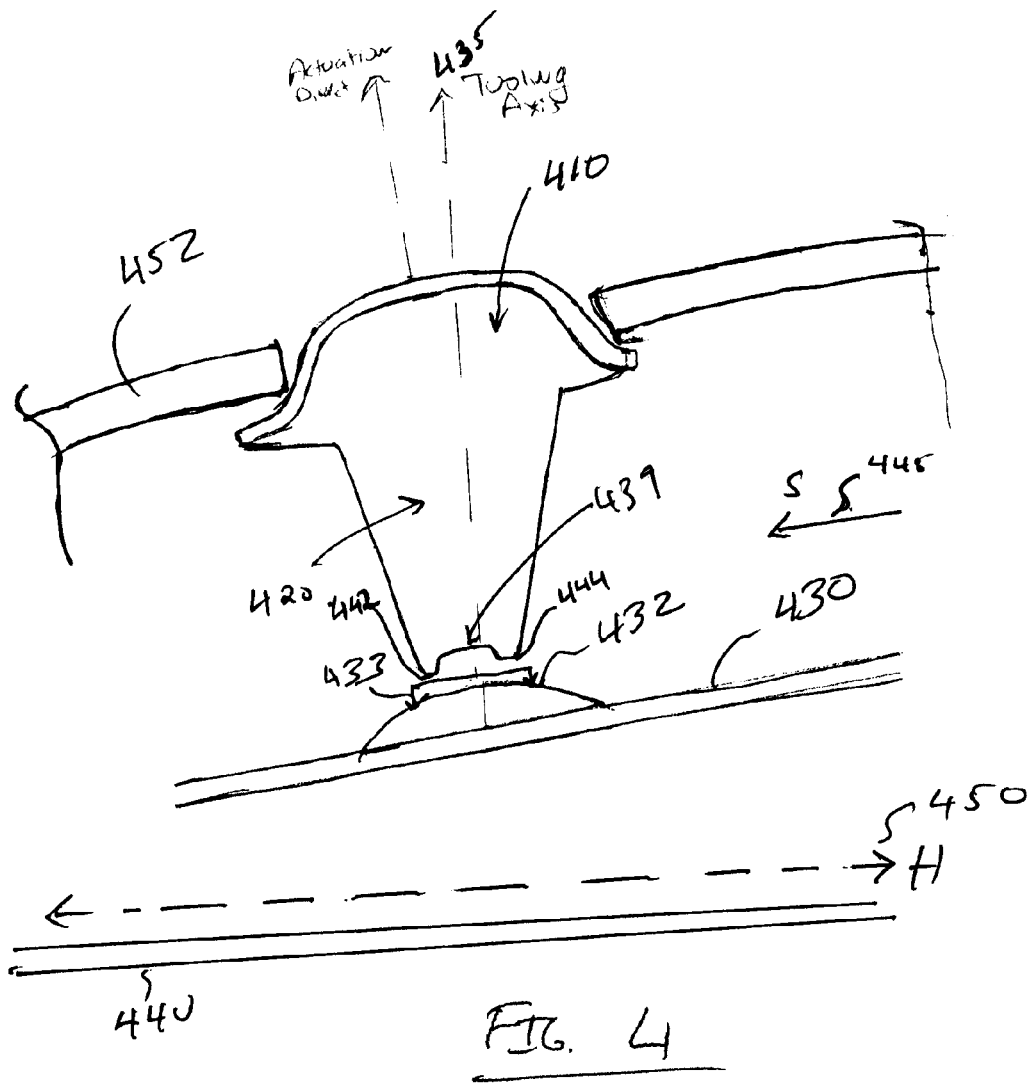
FIG. 4 is a sectional view of a key assembly of a keypad, under an embodiment of the invention.
Figure 9:
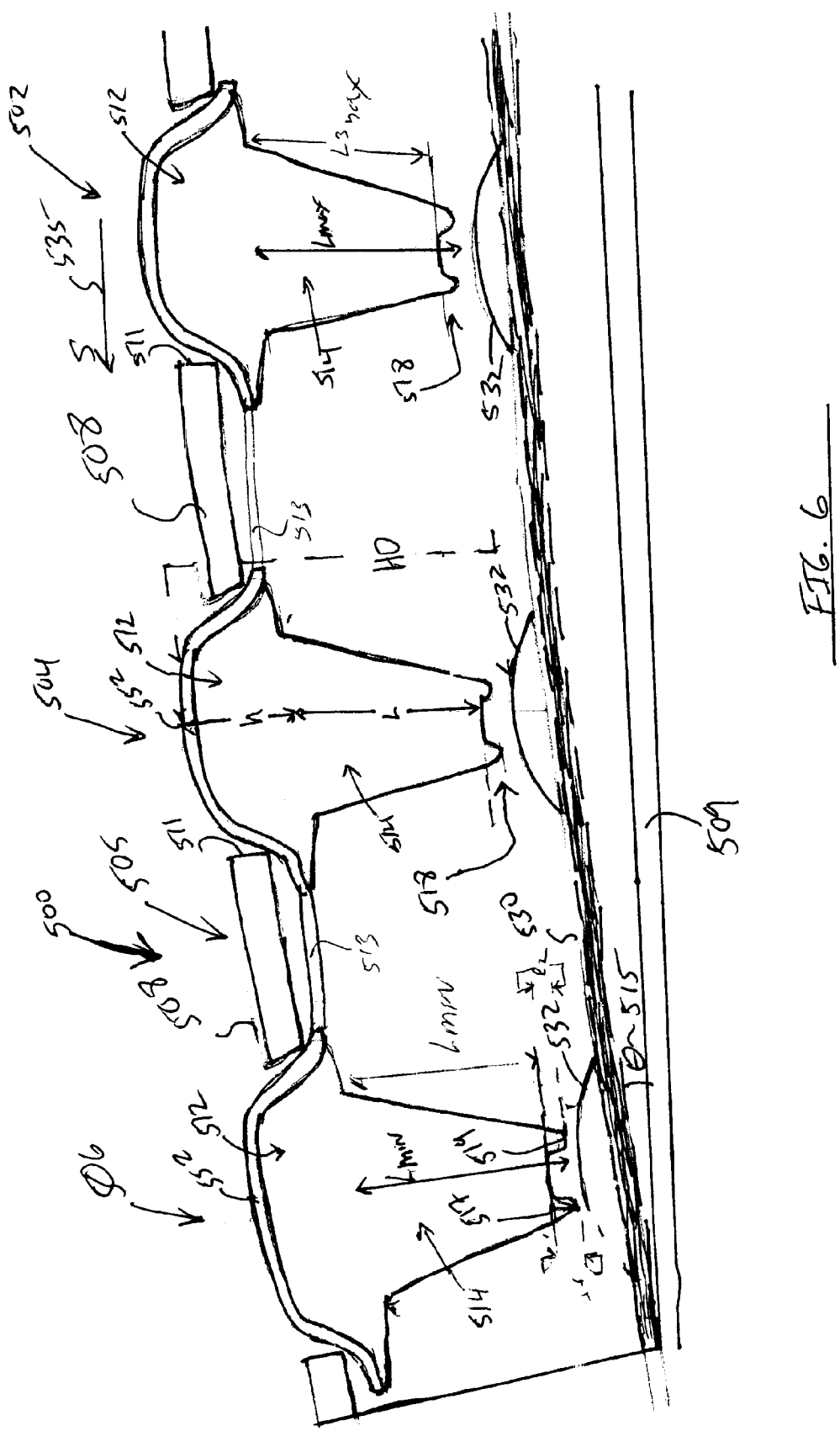
FIG. 9A and FIG. 9B illustrate the case where a computing device has a contour surface that includes a lateral gradient direction and a peak, under an embodiment of the invention.

FIG. 4 is a sectional view of a key assembly of a keypad, under an embodiment of the invention. In an embodiment shown by FIG. 4, the key assembly 400 includes a key cap 410 and an actuation member 420. Both the key cap 410 and the actuation member 420 are aligned over an electrical contact 432 of an underlying substrate 430, so that inward movement of the key directs the actuation member into contact with the electrical contact. One implementation provides that the electrical contact 432 is provided a snap-dome contact, so that with sufficient force, the electrical contact collapses onto another electrical lead to close a switch and trigger a corresponding signal.

As described with, for example, an embodiment of FIG. 3, the key cap 410 is one constituent of a key structure (vertical) and a key layer (horizontal). In one embodiment, the key layer includes a plurality of key caps on which a plurality of keys may be integrated or combined to share a matrix or other platform. In a configuration of FIG. 4, the actuation member 420 is shown to be integrated with the key cap 410 so as to extend unitarily from a bottom surface of the key. In other configurations, however, the actuation member 420 may be separately formed from the key. For example, the actuation member 420 may be part of a separate matrix independently disposed between the key layer and the substrate 430 on which the electrical contact 432 is provided.

An embodiment such as shown in FIG. 4 illustrates different features that may be incorporated into the keyboard assembly to accommodate the inward contour or slope of the electronic device. In FIG. 4, a back face 440 of the electronic device serves as a horizontal reference 450. A front face 452 of the device housing 460 is contoured inward, so that a thickness of the device lessens closer to the bottom 465 of the device. In order to accommodate the lessening thickness and the contour of the front face 452, an embodiment shown by FIG. 4 provides the substrate 430 to be mounted acutely relative to the horizontal reference 450. The angle formed between the substrate 430 and the horizontal reference 450 is less than 10 degrees, and more preferably between 1 and 6 degrees. More preferably, the angle formed between the substrate 430 and the horizontal reference 450 is about 3 degrees.

Another feature that may be incorporated into the key assembly 400 to accommodate the lessening thickness of the housing and contour of the front face 452 is an asymmetric actuation member 420. In particular, each electrical contact 432 includes a strike zone 433. To ensure longevity and reliability of the electrical contact 432, the actuation member 420 should provide a distributed force on the surface of the electrical contact 432 that corresponds to the strike zone 433. A conventionally shaped actuation member would run the risk of the actuation member angularly contacting the strike zone 433 of the electrical contact 432. An embodiment such as shown by FIG. 4 includes a modification to the actuation member 420 to enable the actuation member to contact the strike zone 433 with a more distributive or uniform surface and force. The modification may be in the form of making the actuation member asymmetric in shape of volume.

According to an embodiment, the actuation member 420 is asymmetric because it individually contains more volume or size on the side or portion of a mid-center 435 that is on the downside of the incline. In one embodiment, the added volume is at least partially the result of the actuation member containing an added length on its tip region 439, where it contacts the electrical contact 432. Specifically, under one embodiment, the actuation member 420 includes a peak contact point 442 and a trough contact point 444. A difference in height between the two contact points 442, 444 further accommodate the lessening thickness of housing and the slope of the substrate 430. Specifically, the asymmetric length creates a sloped tip region 439 that better strikes a span of the strike area 433 of the electrical contact 432.

Figure 5:
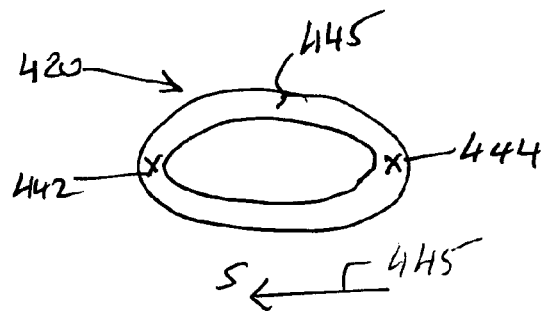
FIG. 5 is a cross-sectional view of the bottom of the actuation member 420, taken along lines A-A.

FIG. 5 is a cross-sectional view of the bottom of the actuation member 420, taken along lines A-A. As shown by FIG. 5, the cross-section of the tip region 439 of the actuation member may be circular or elliptical (or any other shape), and a recess 443 of the tip region may be formed so that only an edge thickness 445 of the tip region makes contact with the electrical contact 432. The peak contact point 442 and trough contact point 444 may be diametrically separated across the mid-axis. In one implementation, the position of the peak contact point 442 and trough contact point 444 may correspond to diametrically opposite points on the cross section of the actuation member 420, maximally separated and in line with the gradient direction 445 of the slope of the housing. An embodiment such as shown by FIG. 5 illustrates the overall orientation of the key caps extending out of the front face as being tilted to coincide with the orientation of the front face. However, other embodiments may utilize other configurations, where for example, the key caps are provided in a step orientation, (more) parallel to the horizontal reference than the front face.

As an alternative to actuation members that are asymmetrical in length, such as shown by embodiment of FIG. 4 and FIG. 5, other embodiments provide for actuation members that are uniform or symmetrical in length, but tilted in orientation. The actuation members may be tilted in orientation, either individually or collectively as a group. The result of the orientation is that the tip region 439 of each actuation member 420 uniformly contacts the strike zone 433 of each electrical contact 432.

FIG. 6 is a sectional view of key assemblies of different rows of a keypad assembly, under an embodiment of the invention. In an embodiment of FIG. 6, a keypad assembly 500 is provided by a housing 505 that includes a sloped or contoured front face 508, oriented inward towards an opposing back face 509. As described by, for example, an embodiment of FIG. 4, a value of an overall thickness of the device lessens along the housing in the downstream direction of the gradient (i.e. closer to the bottom of the device) 535. The components of the keypad assembly 500 includes a substrate 510 having three or more rows 502, 504, and 506, although more or fewer rows may be used, depending on the layout of the keypad in use. For example, many QWERTY keypads utilize three or four rows, so as to include sufficient number of keys.

Each row 502, 504, 506 may include its own set of key structures comprising a key cap 512 and an actuation member 514. In one implementation, the key caps 512 may be formed over an interconnecting matrix 513, so that at least a portion of the keypad is unitarily formed. Each actuation member 514 is aligned over a corresponding electrical contact 532 of an underlying substrate 530. The key caps 512, when considered as a whole, provide a key layer of the overall keypad assembly 500. Likewise, the actuation members 514 may in combination be considered to provide an actuation member layer. The key caps 512 of the key layer may be provided on one or more matrix so as to be interconnected. In one implementation, the matrix may be mounted just underneath the front face 508 of the housing 506, and protrude slightly or be flush with the front face through openings 511 formed in the housing.

According to an embodiment, the keypad assembly 500 includes multiple features to facilitate the keypad assembly to accommodate the contour or slope of the front face 508. As described with, for example, an embodiment of FIG. 4, one of the features that can be incorporated into the keypad assembly 500 is to mount the substrate 530 at an acute angle 515 relative to the back face. Another feature included in the keypad assembly 500 is to structure the actuation members 514 to be asymmetrical. For example, as described with an embodiment of FIG. 4 and FIG. 5, each actuation member 514 may include a tip point 518 that is asymmetric in length about a mid-axis of that member. Each actuation member 514 has one length $l_1$ to a peak (most distal) contact point 517, and a second length $l_2$ to a trough (least distal) contact point 519. Under one embodiment, the asymmetric length of the actuation member 514 is quantified by the difference between $l_1$ and $l_2$.

In an embodiment, the keypad assembly 500 is also structured to include actuation members 514 that are of variable length. In one embodiment, the actuation members has a maximum length ($L_{max}$) upstream on the gradient 535 of the slope of the housing face 508, and a minimum length ($L_{min}$) downstream on the gradient. Such an arrangement assumes the contour of the front face 508 brings the key cap 512 of the third row 506 closer to the substrate 530 than the middle row 504. Likewise, the contour of the front face 508 may bring the key cap 512 of the middle row 504 closer to the substrate 530 than the key cap 512 of the first row 502.

The variation in dimensioning between adjacent key structures may be expressed as a variation in the height distance HD from a key cap peak 552 to the aligned electrical contact 532. The height distance for individual key structures corresponds to a sum of the height h of the keycap 512, a length of the corresponding actuation member 514, and possibly any gap distance to the aligned electrical contact 532. According to one embodiment, along the directional gradient 535 of the contour, the height distance HD of key structures may vary. The variations of the height distances HD of the may be attributable to variations in one or more of (i) height h of the keycaps 512, (ii) the length of the corresponding actuation member 514, and/or (iii) variations in the gap distance to the aligned electrical contact 532.

In an implementation in which the directional gradient is orthogonal to a row-wise arrangement of keycaps, a given key structure may have a different height distance HD than an adjacent or most proximate key structure of each of the other rows. Likewise, as shown with, for example, embodiments of FIG. 9A and FIG. 9B, when there is a cross or horizontal directional gradient, variations in the height distance HD may be present along the cross-gradient directions as well.

While an embodiment such as shown by FIG. 6 illustrates use of a tilted substrate 530 in combination with asymmetrical actuation members 514 and actuation members with variable lengths, other embodiments contemplate use of only one or some of the features described. For example, the orientation of the front face 508 may be accommodated by making the actuation members variable in length, and not necessarily asymmetrical.

Manufacturing Process

FIG. 7A-7D illustrates a process for forming a keypad such as shown and described with an embodiment of FIG. 6, under an embodiment of the invention. In particular, a process as described with FIG. 7A-7D illustrates manufacturing of a keypad with actuation members that have asymmetric lengths. As described with one or more other embodiments, such actuation members facilitate use of the keypad on a housing which has a contoured or sloped front face. In particular, embodiments illustrated by FIG. 7A-7D describe how a keypad may be assembled to include an actuation member with asymmetrical lengths, such as shown and described with an embodiment of FIG. 4.

With reference to FIG. 4, an alternative to using actuation members 420 with asymmetric lengths is to orient the actuation members, either individually or as a group, so that the actuation members 420 are orthogonally aligned with the electrical contacts 432 (FIG. 4) on the acutely mounted substrate 430 (FIG. 4). However, tooling limitations make tilting actuation members off center difficult, as typical molding techniques are more suited for building molds vertically. As such, an embodiment of FIG. 7A-7D describes the manufacturing process for forming actuation members that are asymmetrical in length, through use of vertical molding process.

Figure 7A:
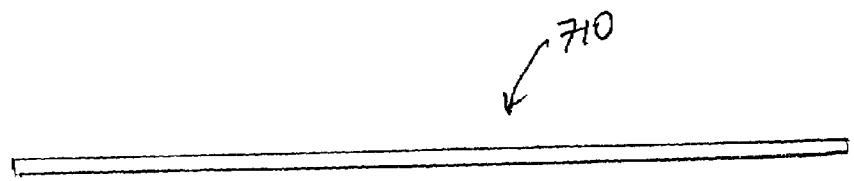
FIG. 7A-7D illustrates a process for forming a keypad such as shown and described with an embodiment of FIG. 6, under an embodiment of the invention.

In FIG. 7A, a key layer 710 of a keypad assembly is formed. A film 710 may be used as the basis for structures or surfaces that result in keys of the keypad. Under one implementation, the film is formed from polycarbonate.

Figure 7B:
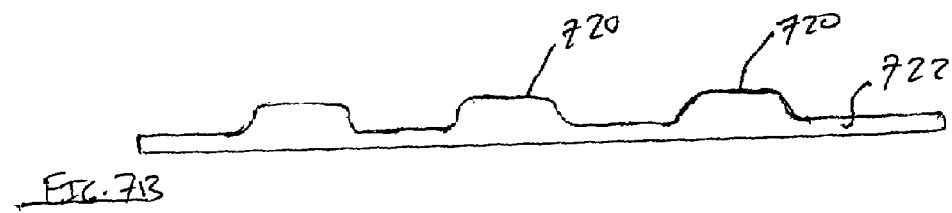

FIG. 7B illustrates application of a vacuum or other processes in which structures 720 corresponding to key caps are drawn from the film 710. The result is that structures corresponding to key caps for a segment or the entire keypad are identified, and provided on a single matrix.

Figure 7C:
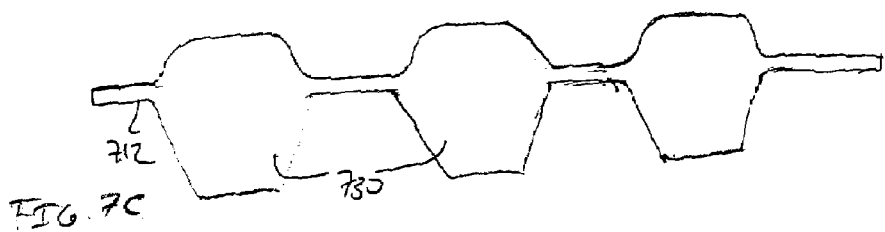

According to an embodiment, FIG. 7C provides that the actuation members for each structure 720 are integrally formed through a molding process that extends a molded structure from an underlying surface 712 of the structures 720. In one embodiment, a side or bottom gate is used to form the molded structure. The molded structure corresponds to the actuation member 730. The resulting molded structure is oblong, such as conical, cylindrical or tubular in shape.

Figure 7D:
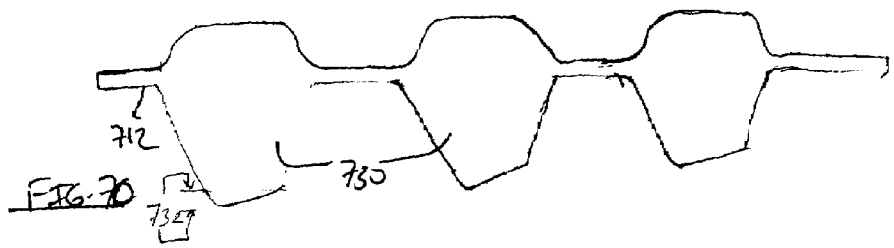

In FIG. 7D, the actuation members 730 are made asymmetrical in length by extending the molding process on one perimeter point of the actuation member 730. This creates an added length 732 on one side of the tip point of the actuation member, as describe with other embodiments.

The amount of added length 732 used may range depending on the position of the actuation member within the keypad. For example, a key that is to be provided on a contour that has a large slope or curvature may require use of an actuation member that has greater additional length 732. Likewise, some of the actuation members 730 on a given keypad may have no additional length, if there is a lack of curvature in the slope or housing, or even if the angle of the substrate (not shown) carrying the electrical contact points is sufficiently angled.

While embodiments described with FIG. 1-FIG. 7 illustrate construction of a keypad, other embodiments may extend the construct of the keypad to other button sets. For example, with reference to FIG. 1, the additional push mechanisms 122, 123, and 124 may be provided or constructed over an acutely angled substrate, and/or provided with actuation members that have an overall length that is different than the length of the actuation members of other push mechanisms (or keys on the keypad). Moreover, one or more embodiments may provide for such additional push mechanisms 122, 123, and 124 to include additional lengths, as described with, for example, an embodiment of FIG. 7A-7D. Numerous other variations and implementations are also contemplated with one or more embodiments of the invention.

Variable Key Cap Size

Another feature that may be incorporated into a keypad to better accommodate a contoured surface are key caps of varying length. Such a feature may be implemented independent of other embodiments, or in combination with one or more embodiments described above.

Figure 8A:
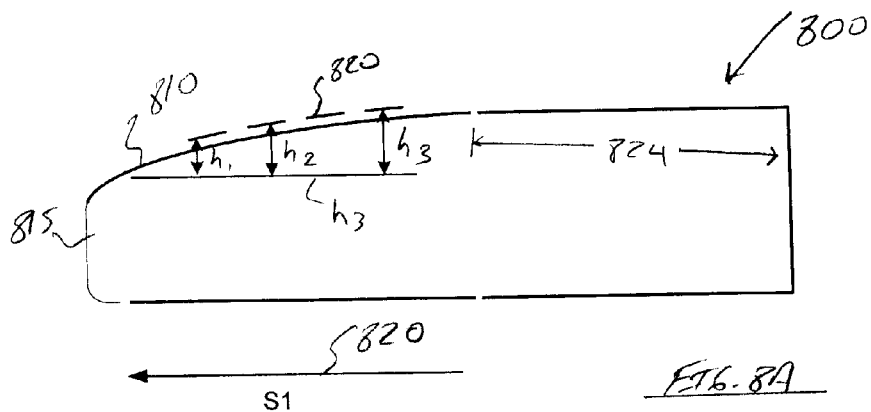
FIG. 8A and FIG. 8B illustrate a feature of varying key cap length that may be implemented on a keypad with a contoured or inclined surface, under an embodiment of the invention.
Figure 8B:
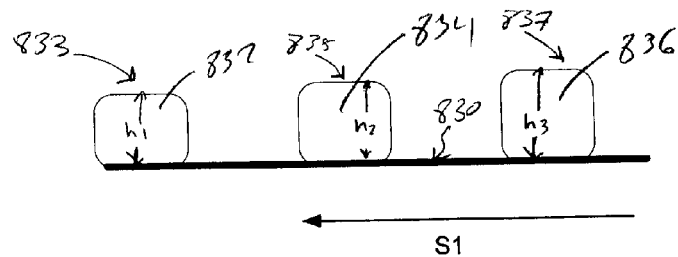

FIG. 8A and FIG. 8B illustrate a keypad that incorporates the feature of varying key cap length, under an embodiment of the invention. In FIG. 8A, a computing device 800 is illustrated with a contoured face 810 on which a keypad is provided. FIG. 8A illustrates only one directional gradient 820 of the contoured front face 810, although as illustrated with FIG. 9A and FIG. 9B, the contour may extend in one or more additional or alternative direction. The directional gradient 820 represents the inward contour of the front face 810, with the contour extending from a horizontal section 824 of the device towards a bottom 815 of the device.

In one embodiment, the key caps of a keypad assembly protrude from the contoured surface 810 of the device 800, with an exterior boundary of the key caps forming a contour 820 that is also contoured. For simplicity, only the contour 820 of the key caps, and not the key caps themselves are shown in FIG. 8A. The contour 820 of the boundary of the key caps may be similar to the contour of the front face 810.

Under many conventional key cap construction, the key caps of a keypad assembly are joined or integrated onto a common matrix 830 (e.g. see FIG. 7A-7D). In order to allow for use of the matrix 830, while enabling the boundary of the key caps to be contoured (and thus compensate for the contour represented by the directional gradient 820), one or more embodiments provide for key caps that vary in length along the direction of the gradient. In FIG. 8B, a key cap 832 of a bottom most row 833 (closest to the bottom 815) has a first height $h_1$, a key cap 834 of a middle row 835 has a second height $h_2$, and a key cap 836 of a top most row 837 has a third height $h_3$.

Under one implementation, the matrix 830 is horizontal, or alternatively slightly acute (e.g. at an angle of less than 5 degrees) with respect to a horizontal. With this positioning of the matrix 830, the relationship of the lengths of the key caps of the different rows is $h_1 < h_2 < h_3$. An alternative orientation of the matrix 830 may produce a different relationship. For example, $h_2 > h_3$ in the case where the matrix 830 has a more pronounced angle with respect to the horizontal.

Figure 9A:
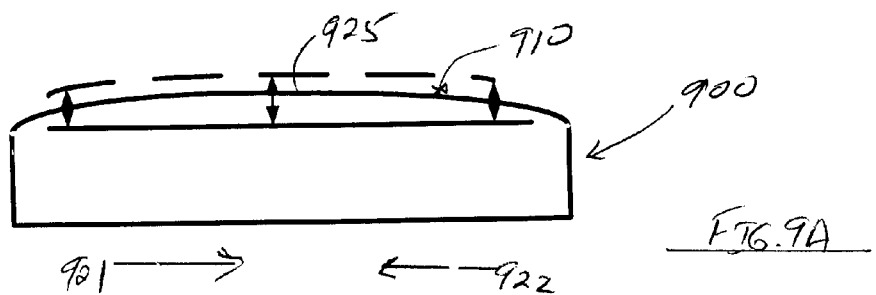
Figure 9B:
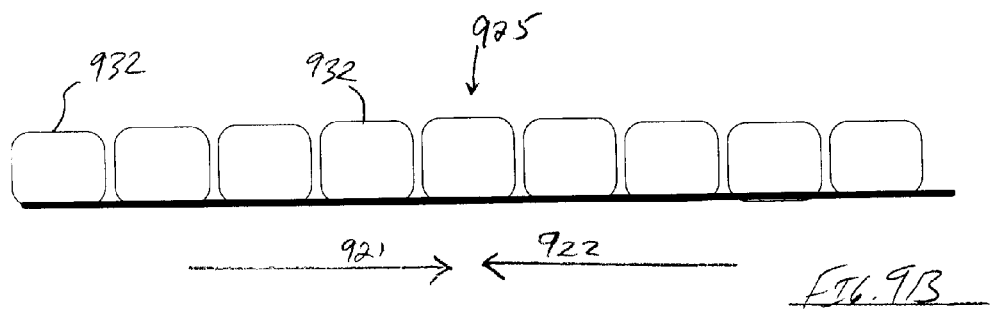

FIG. 9A and FIG. 9B illustrate the case where a computing device has a contour surface that includes multiple lateral gradient directions and a peak, under an embodiment of the invention. In FIG. 9A, a computing device 900 is illustrated with a contoured face 910 on which a keypad is provided. The contoured front face 910 includes a lateral contour with a centerline peak 925, represented by the opposing directional gradients 920, 922.

In an embodiment, a contoured front surface 910 such as shown by FIG. 9A may be provided on a computing device housing that includes a contour such as described by FIG. 8A. In such an embodiment, a front face 910 of the computing device may have contour that has multiple directional gradients, including a vertical/downward gradient (e.g. directional 820 of FIG. 8A) and the lateral gradients 921, 922. The keypad is mounted so that key caps 932 (FIG. 9B) extend from the front face 910. A resulting contour 920 of the keypad loosely matches the outline of the front face 910.

In order to accommodate a keypad assembly that includes key caps provided on a common matrix, FIG. 9B illustrates the lengths of the individual key caps 932 may differ, depending on the relative position of the key caps 932 in the lateral direction. In one embodiment, the height of each key cap 932 depends on the location of that key cap along the directional gradients 920, 922, with the key cap with the greatest height being positioned at or proximate to peak 925.

As mentioned, result of embodiments such as shown by FIGS. 8A, 8B, 9A and 9B is that a keypad can be provided on a multi-dimensional contoured surface by contouring the keypad in a manner that matches to or is similar to the contour of the underlying surface. The contour provided with the keypad further enhances the feel of the keypad on the contoured front face.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A mobile computing device comprising:
   a housing that includes a front face having a portion that has a contour, wherein the contour is inwardly directed to have at least a first gradient direction that decreases a thickness of the housing along a progression in the gradient direction;
   a display screen provided with the front face, apart from the portion that has the contour;
   a keypad provided on the front face, wherein the keypad comprises a plurality of keycaps that extend outward from the front face;
   wherein the keypad is provided at least partially on an occupied region of the portion of the front face that has the contour; and
   wherein a maximum angle formed by the occupied region of the front face relative to a horizontal reference that is coplanar with the display screen is greater than 20 degrees.

2. The mobile computing device of claim 1, wherein the contour of the front face accelerates in relation to proximity of a bottom end of the housing, the bottom end being distal to the display screen.

3. The mobile computing device of claim 1, wherein the keypad comprises a plurality of actuation members, wherein each actuation member is aligned with a corresponding one or more keycaps so that inward direction of a given keycap causes inward movement of the aligned actuation member.

4. The mobile computing device of claim 3, wherein each actuation member is aligned with a corresponding electrical contact provided on a substrate.

5. The mobile computing device of claim 4, wherein the substrate is mounted within the housing at an acute angle relative to the horizontal reference.

6. The mobile computing device of claim 5, wherein the acute angle is less than 5 degrees.

7. The mobile computing device of claim 1, wherein each of the plurality of keycaps is formed over a matrix that is mounted underneath the front face.

8. The mobile computing device of claim 7, wherein the matrix is mounted at an acute angle with respect to the horizontal reference.

9. The mobile computing device of claim 5, wherein the acute angle is greater than 1 degree.

10. The mobile computing device of claim 4, wherein at least a majority of the plurality of keycaps that comprise the keypad are arranged in a plurality of rows that extend in a direction that is orthogonal to the first gradient direction, and wherein the actuation member of a given keycap in a first row of the plurality of rows varies in length as compared to a most proximate keycap in either a second or a third row of the plurality of rows.

11. The mobile computing device of claim 1, wherein at least a majority of the plurality of keycaps that comprise the keypad are arranged in a plurality of rows that extend in a direction that is orthogonal to the first gradient direction, and wherein a height of a given keycap in a first row of the plurality of rows varies in comparison to a height of a most proximate keycap in either a second or a third row of the plurality of rows.

12. The mobile computing device of claim 4, wherein at least some of the actuation members are asymmetric in shape.

13. The mobile computing device of claim 1, wherein the keypad includes a QWERTY layout.

14. A mobile computing device comprising:
   a housing having a display area, wherein the housing includes a front face having a portion that has a contour, the contour being inwardly directed to have at least a first gradient direction that decreases a thickness of the housing along a progression in the gradient direction;
   a keypad assembly comprising a plurality of key structures and a substrate that provides a plurality of electrical contacts, wherein at least some of the plurality of key structures align over the contour, and wherein individual key structures in the keypad align to actuate a corresponding one of the electrical contacts on the substrate by inward movement; and
   wherein the plurality of key structures each include a corresponding keycap that is formed over a matrix that extends at least in part over the contour;
   wherein a height distance of individual key structures corresponds to a separation distance between an exterior of the keycap and an underlying electrical contact;
   wherein the height distance of the individual key structures are varied to at least partially compensate for the contour based at least in part by the corresponding keycaps of those key structures being varied in height along at least the first gradient direction of the contour.

15. The mobile computing device of claim 14, wherein the plurality of key structures are provided in a plurality of rows arranged orthogonally to the first gradient direction, and wherein the height distance of individual key structures are varied as between (i) a given key structure in a first one of the rows and a first most proximate key structure to the given key structure in a second row, and (ii) a second most proximate key structure to the given key structure in a third row.

16. The mobile computing device of claim 14, wherein the substrate is aligned to be co-planar with a display screen that is mounted in the display area, and wherein the matrix is provided underneath the front face at an acute angle with respect to the substrate.

17. The mobile computing device of claim 14, wherein at least some of the plurality of key structures of the keypad each include an actuation member that extends inward to actuate the electrical contact of that key structure, and wherein the height distance of at least some of the individual key structures is varied at least in part by a length of the actuation members of at least some of the individual key structures being varied along at least the first gradient direction of the contour.

18. The mobile computing device of claim 17, wherein the plurality of key structures are provided in a plurality of rows arranged orthogonally to the first gradient direction, and wherein the length of the actuation members of at least some of the individual key structures are varied between (i) a given key structure in a first one of the rows and a first most proximate key structure to the given key structure in a second row, and (ii) a second most proximate key structure to the given key structure in a third row.

19. The mobile computing device of claim 14, wherein relative to a display screen mounted in the display area, the substrate is mounted at an acute angle.

20. The mobile computing device of claim 18, wherein at least some of the plurality of actuation members are asymmetrical in shape.

21. The mobile computing device of claim 14, further comprising a set of one or more mechanical push mechanisms in addition to the keypad, wherein at least one of the push mechanisms in the set is positioned on the portion of the front face that is oriented inward.

22. The mobile computing device of claim 14, wherein the keypad includes a QWERTY layout.

\* \* \* \* \*